(12) United States Patent
Flamini (10) Patent No.: US 9,106,597 B2
(45) Date of Patent: Aug. 11, 2015

(54) UPDATING AN E-MAIL RECIPIENT LIST

(71) Applicant: International Business Machines Corporation, Armonk, NY (US)

(72) Inventor: Elisabetta Flamini, Romsey (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 219 days.

(21) Appl. No.: 13/796,055

(22) Filed: Mar. 12, 2013

(65) Prior Publication Data

US 2014/0280607 A1    Sep. 18, 2014

(51) Int. Cl.
| | |
|---|---|
| *G06F 15/16* | (2006.01) |
| *H04L 12/58* | (2006.01) |
| *H04L 12/24* | (2006.01) |
| *H04L 29/12* | (2006.01) |

(52) U.S. Cl.
CPC ............. *H04L 51/04* (2013.01); *H04L 41/026* (2013.01); *H04L 61/15* (2013.01)

(58) Field of Classification Search
CPC .... G06Q 10/107; H04L 12/585; H04L 12/58; H04L 12/581; H04L 12/5855
USPC ......................................................... 709/206
See application file for complete search history.

(56) References Cited

U.S. PATENT DOCUMENTS

| | | | |
|---|---|---|---|
| 7,707,260 | B2 | 4/2010 | Baratakke et al. |
| 2005/0080855 | A1* | 4/2005 | Murray ........................ 709/206 |
| 2007/0050456 | A1 | 3/2007 | Vuong et al. |
| 2007/0083602 | A1* | 4/2007 | Heggenhougen et al. ..... 709/206 |
| 2007/0112785 | A1* | 5/2007 | Murphy et al. ................. 707/10 |
| 2008/0098070 | A1 | 4/2008 | Heidloff et al. |
| 2008/0098072 | A1* | 4/2008 | Jones et al. ................... 709/206 |
| 2008/0306972 | A1 | 12/2008 | Wilkin et al. |
| 2010/0293475 | A1 | 11/2010 | Nottingham et al. |

OTHER PUBLICATIONS

"Web 2.0 Email Clients—Emails as RSS Feeds", [online] IP.com Prior Art Database, Disclosure No. IPCOM000184902D, Jul. 4, 2009, retrieved from the Internet: <http://ip.com/IPCOM/000184902>, 2 pgs.

"Automatically Include Email Forward Recipients in Email Thread", [online] IP.com Prior Art Database, Disclosure No. IPCOM000210966D, Sep. 19, 2011, retrieved from the Internet: <http://ip.com/IPCOM/000210966>, 2 pgs.

* cited by examiner

*Primary Examiner* — Jimmy H Tran
*Assistant Examiner* — Wuji Chen
(74) *Attorney, Agent, or Firm* — Cuenot, Forsythe & Kim, LLC (57) ABSTRACT

Arrangements describe herein relate to updating an e-mail recipient list. A first version of an e-mail can be received, the first version comprising a message header identifying at least a first e-mail recipient. The first version of the e-mail can be sent to the first e-mail recipient indicated in the message header. A second version of the e-mail can be received, the second version of the e-mail indicating at least a second e-mail recipient. The second version can be sent to the at least second e-mail recipient indicated in the message header of the second version. An update request for the first version can be received, the update request configured to be processed to update the message header of the first version to add the at least second e-mail recipient to the message header. The update request can be sent to the at least first e-mail recipient.

14 Claims, 8 Drawing Sheets

C: HELO server.com
S: 250 Ok
C: MAIL FROM:<me@server.com>
S: 250 Ok
C: RCPT TO:<you@server.com>
S: 250 Ok
C: DATA
S: 354 End data with <CR><LF>.<CR><LF>

202 {
C:<?xml version="1.0" ?>
C:<entry xmlns="http://www.w3.org/2005/Atom" >
C:<id>urn:uuid:3738a689-f753-4b96-2134-583d983a1267<\id>
C:<title>Atom-Email</title>
C:<updated>2006-08-12T13:40:03Z</updated>
C:<author><name>Me</name></author>
C:<summary>Some text.</summary>
C:<content>
C: From: "Me" <me@server.com>
C: To: "You" <you@server.com>
C: Cc: him@server.com
C: Date: Wed, 28 November 2012 15:33:03 -0100
C: Subject: Original email
C:
C: Hello You.
C:</content>
C:</entry>
}

C: .
S: 250 Ok: queued as 1000
C: QUIT
S: 221 Bye

C: HELO server.com
S: 250 Ok
C: MAIL FROM:<me@server.com>
S: 250 Ok
C: RCPT TO:<newrecipient@server.com>
S: 250 Ok
C: DATA
S: 354 End data with <CR><LF>.<CR><LF>

302 {
C:<?xml version="1.0" ?>
C:<entry xmlns="http://www.w3.org/2005/Atom" >
C:<id>urn:uuid:3738a689-f753-4b96-2134-583d983a1267<\id>
C:<title>Atom-Email</title>
C:<updated>2012-28-12T15:40:03Z</updated>
C:<author><name>Me</name></author>
C:<summary>Some text.</summary>
C:<content>
C: From: "Me" <me@server.com>
C: To: "You" <you@server.com>
C: Cc: him@server.com, newrecipient@server.com
C: Date: Wed, 28 November 2012 15:40:03 -0100
C: Subject: Original email
C:
C: Hello You.
C:</content>
C:</entry>

C: .
S: 250 Ok: queued as 1000
C: QUIT
S: 221 Bye

C: HELO server.com
S: 250 Ok
C: UPDT FROM:<me@server.com>
S: 250 Ok
C: RCPT TO:<you@server.com>
S: 250 Ok
C: DATA
S: 354 End data with <CR><LF>.<CR><LF>

402 {
C:<?xml version="1.0" ?>
C:<entry xmlns="http://www.w3.org/2005/Atom" >
C:<id>urn:uuid:3738a689-f753-4b96-2134-583d983a1267<\id>
C:<title>Atom-Email</title>
C:<updated>2012-28-12T15:40:03Z</updated>
C:<author><name>Me</name></author>
C:<summary>Some text.</summary>
C:<content>
C: From: "Me" <me@server.com>
C: To: "You" <you@server.com>
C: Cc: him@server.com, newrecipient@server.com
C: Date: Wed, 28 November 2012 15:40:03 -0100
C: Subject: Original email
C:
C: Hello You.
C:</content>
C:</entry>

C: .
S: 250 Ok: queued as 1000
C: QUIT
S: 221 Bye

```
┌─────────────────────────────────────────────────────────────────────────┐
│ Receive, via an e-mail client, a first version of an e-mail, the first  │
│ version of the e-mail comprising a message header identifying at least  │
│ a first e-mail recipient                                                │
│                                   502                                   │
└─────────────────────────────────────────────────────────────────────────┘
                                    │
                                    ▼
┌─────────────────────────────────────────────────────────────────────────┐
│ Send, via a processor, the first version of the e-mail to the at least  │
│ first e-mail recipient indicated in the message header of the first     │
│ version of the e-mail                                                   │
│                                   504                                   │
└─────────────────────────────────────────────────────────────────────────┘
                                    │
                                    ▼
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│ Optionally, receive from the first e-mail recipient a reply to the      │
│ first version of the e-mail and send the reply to the e-mail client.    │
│                                   506                                   │
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
                                    │
                                    ▼
┌─────────────────────────────────────────────────────────────────────────┐
│ Receive, from the e-mail client, a second version of the e-mail, a      │
│ message header of the second version of the e-mail indicating at least  │
│ a second e-mail recipient                                               │
│                                   508                                   │
└─────────────────────────────────────────────────────────────────────────┘
                                    │
                                    ▼
┌─────────────────────────────────────────────────────────────────────────┐
│ Send the second version of the e-mail to the at least second e-mail     │
│ recipient indicated in the message header of the second version of the  │
│ e-mail                                                                  │
│                                   510                                   │
└─────────────────────────────────────────────────────────────────────────┘
                                    │
                                    ▼
┌─────────────────────────────────────────────────────────────────────────┐
│ Receive, via the e-mail client, an update request for the first version │
│ of the e-mail sent to the at least first e-mail recipient, the update   │
│ request configured to be processed to update the message header of the  │
│ first version of the e-mail to add the at least second e-mail recipient │
│ to the message header                                                   │
│                                   512                                   │
└─────────────────────────────────────────────────────────────────────────┘
                                    │
                                    ▼
┌─────────────────────────────────────────────────────────────────────────┐
│ Send the update request to the to the at least first e-mail recipient   │
│                                   514                                   │
└─────────────────────────────────────────────────────────────────────────┘
```

Present a notification to the first e-mail recipient indicating that the reply to the first version of the e-mail was generated by the first recipient before the update request, the notification prompting the first e-mail recipient to indicate whether the recipient list of the reply e-mail is to be updated with the at least second e-mail recipient
602

Responsive to the first e-mail recipient indicating that the recipient list of the reply e-mail is to be updated with the at least second e-mail recipient, send a second update request to the e-mail client of the sender of the first version of the e-mail to update the reply e-mail with the at least second e-mail recipient.
604

Send the reply e-mail to the at least second e-mail recipient.
606

UPDATING AN E-MAIL RECIPIENT LIST

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Arrangements described herein relate to electronic communication and, more particularly, electronic mail (e-mail).

The use of email as a means of communication has become common place. E-mail is a means for exchanging digital messages (e-mails) from an author to one or more recipients. An e-mail typically includes a message body and a message header. The message body typically contains content of the e-mail, for example alphanumeric text. Images and other files also can be embedded in the message body, or sent with the e-mail as attachments.

The message header typically comprises a plurality of message header fields, for example "From" field that indicates who sent the e-mail, a "Date" field that indicates the time and date the e-mail is sent, a "To" field that indicates recipients (i.e., e-mail addresses and, optionally, names associated with recipients) of the e-mail, a "Cc" (carbon copy) field that indicates recipients being copied on the e-mail, a "Bcc" (blind carbon copy) field that indicates recipients being blind copied on the e-mail, and a "Subject" field. Such message fields are well known to those skilled in the art. The message headers also may include a number of other fields, as also is well known to those skilled in the art.

BRIEF SUMMARY

One or more embodiments disclosed within this specification relate to updating an e-mail recipient list.

A method includes receiving, via an e-mail client, a first version of an e-mail, the first version of the e-mail comprising a message header identifying at least a first e-mail recipient, and sending, via a processor, the first version of the e-mail to the at least first e-mail recipient indicated in the message header of the first version of the e-mail. The method further can include receiving, via the e-mail client, a second version of the e-mail, a message header of the second version of the e-mail indicating at least a second e-mail recipient, and sending the second version of the e-mail to the at least second e-mail recipient indicated in the message header of the second version of the e-mail. The method further can include receiving, via the e-mail client, an update request for the first version of the e-mail sent to the at least first e-mail recipient, the update request configured to be processed to update the message header of the first version of the e-mail to add the at least second e-mail recipient to the message header, and sending the update request to the at least first e-mail recipient.

A system includes a processor programmed to initiate executable operations. The executable operations can include receiving, via an e-mail client, a first version of an e-mail, the first version of the e-mail comprising a message header identifying at least a first e-mail recipient, and sending the first version of the e-mail to the at least first e-mail recipient indicated in the message header of the first version of the e-mail. The executable operations further can include receiving, via the e-mail client, a second version of the e-mail, a message header of the second version of the e-mail indicating at least a second e-mail recipient, and sending the second version of the e-mail to the at least second e-mail recipient indicated in the message header of the second version of the e-mail. The executable operations further can include receiving, via the e-mail client, an update request for the first version of the e-mail sent to the at least first e-mail recipient, the update request configured to be processed to update the message header of the first version of the e-mail to add the at least second e-mail recipient to the message header, and sending the update request to the at least first e-mail recipient.

A computer program product for updating an e-mail recipient list includes a computer readable storage medium having program code stored thereon, the program code executable by a processor to perform a method. The method includes receiving, by the processor, via an e-mail client, a first version of an e-mail, the first version of the e-mail comprising a message header identifying at least a first e-mail recipient, and sending, by the processor, the first version of the e-mail to the at least first e-mail recipient indicated in the message header of the first version of the e-mail. The method further can include receiving, by the processor, via the e-mail client, a second version of the e-mail, a message header of the second version of the e-mail indicating at least a second e-mail recipient, and sending, by the processor, the second version of the e-mail to the at least second e-mail recipient indicated in the message header of the second version of the e-mail. The method further can include receiving, by the processor, via the e-mail client, an update request for the first version of the e-mail sent to the at least first e-mail recipient, the update request configured to be processed to update the message header of the first version of the e-mail to add the at least second e-mail recipient to the message header, and sending, by the processor, the update request to the at least first e-mail recipient.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Arrangements described herein relate to updating an e-mail recipient list of an e-mail at the recipient side and at the sender side, after a first version of the e-mail has been sent. In illustration, a user may send an e-mail to one or more recipients. After sending the e-mail, the user may realize that he/she forgot to include one or more other recipients, or otherwise may arrive at a conclusion that the e-mail should be sent to one or more other recipients. Absent the present invention, if the user merely forwards the original e-mail to the other (new) recipient(s), the version of the e-mail received by the original recipients will not indicate the new recipients in the recipient list. Further, rather than showing a single e-mail sent to all recipients, the user will have, as sent items, a version of the e-mail sent to the original recipients, and another version of the e-mail sent to the new recipients. Thus, the user, or any of the recipients, would not be able to open the original version of the e-mail, choose a reply-to-all feature, and generate a reply e-mail that includes as recipients both the original recipients and the new recipients.

The present arrangements address this issue. Specifically, after sending an e-mail to one or more recipients, which is considered herein to be a first version of the e-mail, the user can choose to send the same e-mail to other recipients. When the same e-mail is sent to the other recipients, it is considered herein to be a second version of the e-mail since it is sent to at least one recipient that is not included in a recipient list of the first e-mail as originally sent. When the same e-mail is sent to the other recipients, in other words a second version of the e-mail is sent, the first version of the e-mail can be updated to include in the recipient list of the first version the recipients to whom the second version of the e-mail is sent. Further, the second version can indicate all recipients of the first and second versions of the e-mail, although the second version of the e-mail need not be sent to the original recipients since the first version was already sent to them.

Accordingly, when any of the recipients who received either version of the e-mail choose to reply to the e-mail by selecting a reply-to-all feature, recipients of all versions of the e-mail will be indicated in a recipient list of the reply e-mail (though the person generating the reply e-mail need not be included). These arrangements can be extended to additional versions of the e-mail, for example a third version, a fourth version, a fifth version, and so on.

Figure 1:
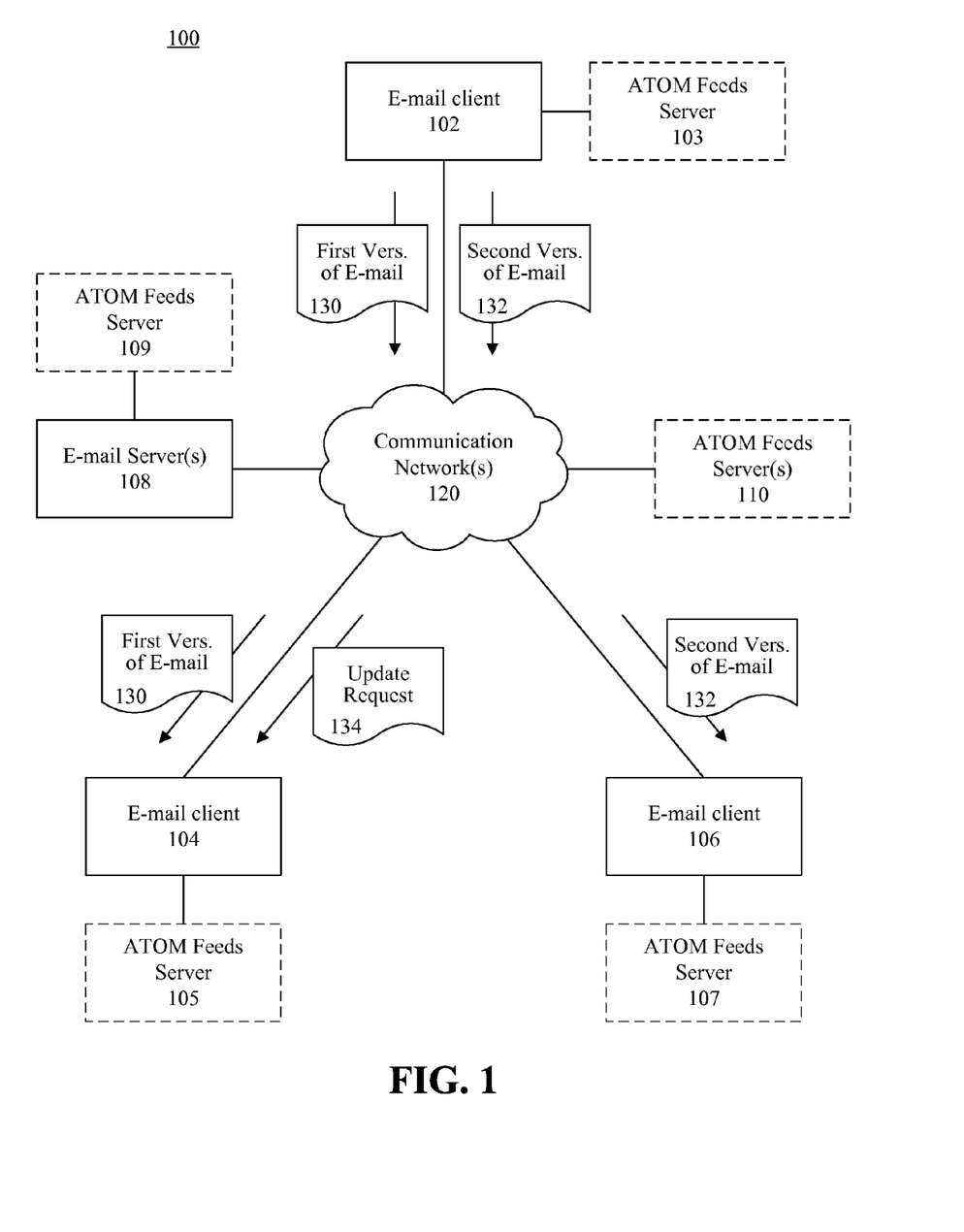
FIG. 1 is a block diagram illustrating a system for updating an e-mail recipient list in accordance with one embodiment disclosed within this specification.

FIG. 1 is a block diagram illustrating a system 100 for updating an e-mail recipient list in accordance with one embodiment disclosed within this specification. As used herein, the term "e-mail" means electronic mail. The system can include one or more e-mail clients 102, 104, 106, one or more e-mail servers 108 and one or more ATOM feeds servers 110. The e-mail clients 102-106 and the e-mail server(s) 108 can be communicatively linked via one or more communication networks 120. In one example, the e-mail client 102 and the e-mail client 104 both may be communicatively linked to a common e-mail server 108. In another example, the e-mail client 102 may be communicatively linked to a first e-mail server 108, and the e-mail client 104 may be communicatively linked to a second e-mail server 108. The first e-mail server 108 and the second e-mail server 108 can be communicatively linked. Similarly, the e-mail client 106 may be communicatively linked to the same e-mail server 108 as the e-mail client 102 and/or the e-mail client 104, or another e-mail server 108.

In one arrangement, a respective ATOM feeds server 103, 105, 107, 109 can be associated with each of the e-mail clients 102-106 and the e-mail server(s) 108. For example, a respective ATOM feeds server can execute on each of the processing systems on which the respective e-mail clients 104-106 execute, and a respective ATOM feeds server can execute on a same processing system on which one or more of the e-mail servers 108 execute. In another arrangement, one or more ATOM feeds server(s) 110 can be hosted by processing systems to which the e-mail clients 102-106 and/or the e-mail server(s) 108 are communicatively linked via the communication network(s) 120.

The communication network(s) 120 can comprise any suitable public and/or private networks, for example the Internet, a wide area network (WAN), a wireless wide area network (WWAN), a local area network (LAN), a wireless local area network (WLAN), a personal area network (PAN), a wireless communication network, a cellular communication network, and/or the like. The communication network(s) 120 can include any combination of the above networks and/or other types of networks. The communication network(s) 120 can include one or more routers, switches, access points, wireless access points, and/or the like. The communication network(s) 120 can be configured to communicate via Hypertext Transfer Protocol (HTTP), Simple Mail Transfer Protocol (SMTP), Post Office Protocol (POP), ATOM Publishing Protocol and/or any other suitable communication protocols.

As used herein, the term "e-mail client" means an application configured to be executed by a processing system, the application configured to generate e-mails and/or configured to receive e-mails and present the e-mails to a user. An e-mail client can be executed on a client device, for example on a computer, a workstation, a mobile computer, a laptop computer, a tablet computer, a smartphone, a personal digital assistant, or any other suitable processing device. An e-mail client also can be executed on a server, for example as a web based application. In such an arrangement, a client device can connect to the server to access the e-mail client, for example using a web browser. The e-mail server(s) 108 and the ATOM feeds server(s) also can be implemented as applications executing on suitable processing systems.

Via the e-mail client 102, an e-mail can be generated, for example via one or more user inputs. The e-mail can identify one or more recipients, for example in a "To" field, a "Cc" filed and/or a "Bcc" field in a message header of the e-mail, and can be communicated to the recipients in a suitable manner. In this regard, the e-mail, as initially generated, can be considered to be a first version 130 of the e-mail (hereinafter "first version"). The first version 130 can be sent from the e-mail client 102 to the recipient(s). For example, the first version 130 of the e-mail can be sent to e-mail accounts associated with the respective recipients, which can be hosted on one or more e-mail servers 108.

In one arrangement, the first version 130 of the e-mail (e.g., header, body, etc.) can be formatted as content in an ATOM feed entry, and can be included in an ATOM feed entry creation request which indicates that the ATOM feed entry is to be stored as an entry in one or more ATOM feeds. In illustration, when sent to the respective recipients, the first version 130 can be sent via at least one of the e-mail servers 108 using SMTP.

Figure 2:
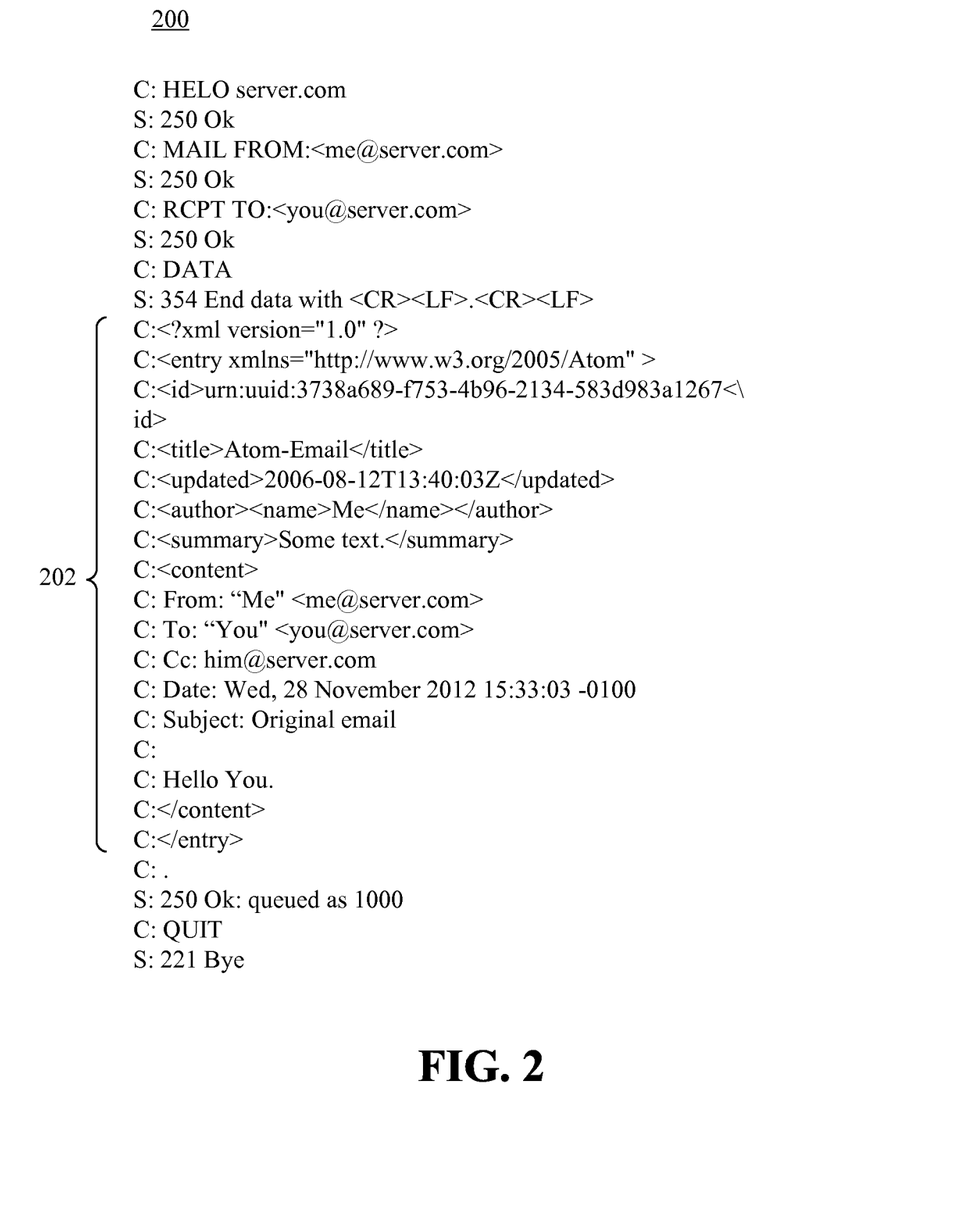
FIG. 2 depicts an example of a SMTP exchange between an e-mail client and an e-mail server when the e-mail client sends a first version of an e-mail in accordance with one embodiment disclosed within this specification.

FIG. 2 depicts an example of a SMTP exchange 200 between the e-mail client 102 and the e-mail server 108 when the e-mail client 102 sends the first version 130 of the e-mail. In FIG. 2, requests/commands sent from the e-mail client 102 to the e-mail server 108 are indicated by "C:" and responses/commands sent from the e-mail server 108 to the e-mail client 102 are indicated by "S:".

In FIG. 2, the command "MAIL FROM: <me@server.com>" can correspond to the MAIL command defined in SMTP, thus indicating that the communication pertains to an e-mail. The command "RCPT TO: <you@server.com>" can indicate the recipients of the first version 130 of the e-mail. The command "DATA" can correspond to the DATA command defined in SMTP, and in the present case actually reports an ATOM feed entry 202, for the first version 130 of the e-mail, contained in the requests/commands sent from the e-mail client 102 to the e-mail server 108. The element "content" (e.g., XML element) in the ATOM feed entry 202 can indicate that the data contained in the element is content for the first version 130 of the e-mail. The alphanumeric text "urn:uuid:3738a689-f753-4b96-2134-583d983a1267" in the "id" element can provide a unique identifier (e.g., "3738a689-f753-4b96-2134-583d983a1267") for the first version 130 of the e-mail, which can later be used to update the ATOM feed entry corresponding to the first version 130 of the e-mail. In the ATOM feed entry 202, "To:" and "Cc:" can be fields in the e-mail header, thus "'You' <you@server.com>" can indicate to whom the first version 130 of the e-mail is sent and the "him@server.com" can indicate who is copied on the first version 130 of the e-mail. A "Bcc" field (not shown) also can be a field in the e-mail header.

The e-mail client 102 also can communicate the first version 130 of the e-mail, via ATOM publishing protocol, to a respective ATOM feeds server 103 (or ATOM feeds server 110) associated with the e-mail client 102, and such ATOM feeds server can store the ATOM feed entry 202. The e-mail server(s) 108 can be configured to understand the requests/commands sent by the e-mail client 102 and appropriately store the ATOM feed entry 202 in a respective ATOM feeds server 109 (or ATOM feeds server 110) using the ATOM Publishing Protocol.

The respective recipients of the first version 130 of the e-mail can receive the first version 130 from the e-mail server(s) 108 as respective ATOM feeds entries. For example, via the e-mail client 104, a recipient can receive the first version 130 from the e-mail server 108 via POP or another suitable protocol. As noted, the first version 130 can include an ATOM feed entry creation request. Accordingly, the e-mail client 104 can communicate the first version 130 of the e-mail to an ATOM feeds server 105 (or ATOM feeds server 110) using the ATOM Publishing Protocol, and the ATOM feeds server associated with the user of the e-mail client 104 can store the ATOM feed entry 202.

Referring again to FIG. 1, at some point, the user who sent the e-mail may decide to add one or more additional recipients to the recipient list of the e-mail, such as one or more other recipients who did not receive the first version 130. In illustration, a second version 132 of the e-mail can be sent to a user associated with the e-mail client 106. To do so, the user associated with the e-mail client 102 can open the first version 130 in the e-mail client 102, or another suitable device associated with the user, for example from the user's sent items folder or another location where a copy of the first version 130 is stored, and select "Reply" or "Reply All" to generate a reply e-mail (i.e., a second version 132 of the e-mail). The user can add the other recipient(s) to a recipient field, such as a "To" field, "Cc" field or a "Bcc" field in the message header of the second version 132 of the e-mail. In this regard, the only difference between the first version 130 and the second version 132 may be the recipients listed in the "To" field and/or "Cc" field in the message header of the e-mail. Thus, the content contained in the body of the second version 132 may be the same as the content of the first version 130, other than the original recipient lists. In this regard, the e-mail client 102 can include a feature, such as a button, an icon, a menu selection or the like, which allows the user of the e-mail client 102 to add additional recipients to the e-mail after the e-mail has already been sent, thus generating the second version 132 of the e-mail.

In one arrangement, the second version 132 of the e-mail (e.g., header, body, etc.) can be formatted as content in an ATOM feed entry, and can be included in an ATOM feed entry creation request which indicates that the ATOM feed entry is to be stored as an entry in one or more ATOM feeds and published. In illustration, when sent to the respective recipients, the second version 132 can be sent via at least one of the e-mail servers 108 using SMTP.

Figure 3:
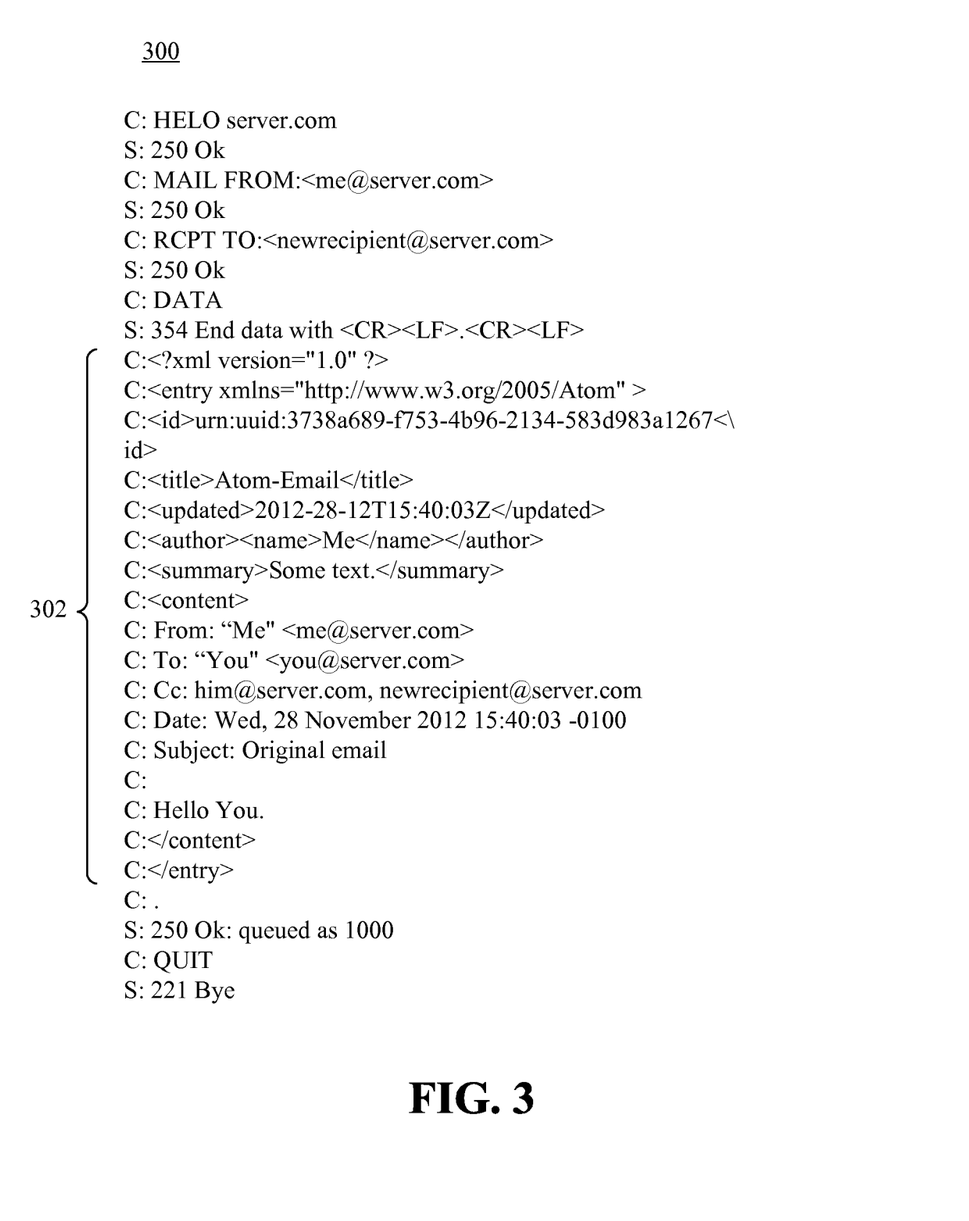
FIG. 3 depicts an example of a SMTP exchange between an e-mail client and an e-mail server when the e-mail client sends a second version of an e-mail in accordance with one embodiment disclosed within this specification.

FIG. 3 depicts an example of a SMTP exchange 300 between the e-mail client 102 and the e-mail server 108 when the e-mail client 102 sends the second version 132 of the e-mail. In FIG. 3, requests/commands sent from the e-mail client 102 to the e-mail server 108 are indicated by "C:" and responses/commands sent from the e-mail server 108 to the e-mail client 102 are indicated by "S:".

In FIG. 3, the command "MAIL FROM: <me@server.com>" can correspond to the MAIL command defined in SMTP, thus indicating that the communication pertains to an e-mail. The command "RCPT TO: <newrecipient@server.com>" can indicate the new recipients of the second version 132 of the e-mail. The command "DATA" can correspond to the DATA command defined in SMTP, and in the present case actually reports the ATOM feed entry 302, for the second version 132 of the e-mail, contained in the requests/commands sent from the e-mail client 102 to the e-mail server 108. The "content" element (e.g., XML element) in the ATOM feed entry 302 can indicate that the data contained in the element is content for the second version 132 of the e-mail. The alphanumeric text "urn:uuid: 3738a689-f753-4b96-2134-583d983a1267" in the "id" element can provide the unique identifier (e.g., "3738a689-f753-4b96-2134-583d983a1267") corresponding to the first version 130 of the e-mail, which can be used to associate the second version 132 of the e-mail with the first version 130. In the ATOM feed entry 302, "To:" and "Cc:" can be fields in the e-mail header, thus "<you@server.com>" can indicate to whom the second version 132 of the e-mail is sent and "Cc: him@server.com, newrecipient@server.com" can indicate who is copied on the second version 132 of the e-mail. A "Bcc" field (not shown) also can be a field in the e-mail header.

The e-mail client 102 also can communicate the second version 132 of the e-mail, via ATOM publishing protocol, to a respective ATOM feeds server 103 (or ATOM feeds server 110) associated with the e-mail client 102, and such ATOM feeds server can store the ATOM feed entry 302. The e-mail server(s) 108 can be configured to understand the requests/commands sent by the e-mail client 102 and appropriately store the ATOM feed entry 302 in a respective ATOM feeds server 109 (or ATOM feeds server 110) using the ATOM Publishing Protocol.

The respective recipients of the second version 132 of the e-mail can receive the second version 132 of the e-mail from the e-mail server(s) 108 as respective ATOM feeds entries. For example, via the e-mail client 106, a recipient can receive second version 132 from the e-mail server 108 via POP or another suitable protocol. As noted, the second version 132 can include an ATOM feed entry creation request. Accordingly, the e-mail client 106 can communicate the second version 132 of the e-mail to an ATOM feeds server 107 (or ATOMS feed server 110) using the ATOM Publishing Protocol, and such server can store the ATOM feed entry 302.

Referring again to FIG. 1, when the second version 132 of the e-mail is sent to one or more new recipients, such as a user of the e-mail client 106, an update request 134 can be generated by the e-mail client 102 and sent to recipients who received the first version 130 of the e-mail, for instance a user of the e-mail client 104. The update request 134 can be a request to update the first version 130 of the e-mail. In one arrangement, responsive to receiving via the e-mail client 102 the second version 132 of the e-mail, the user to can be prompted, by the e-mail client 102 or the e-mail server 108, to indicate whether the user chooses to generate the update request 134. Responsive to the user indicating that the user chooses to generate the update request, the e-mail client 102 or the e-mail server 108 can automatically generate the update request 134. In one aspect, the update request 134 may only be generated if the user choosing that the update request 134 be generated is authorized to do so.

In one arrangement, the update request 134 can indicate an ATOM update request, including information indicating that one or more recipient fields (e.g., "TO" and "CC" fields) of existing ATOM feed entries for the first version 130 of the e-mail are to be updated in accordance with the update request 134 and, more particularly, to add to such recipient fields the recipients of the second version 132 of the e-mail. The recipient fields can be contained in the message header of the first version 130 of the e-mail. In illustration, when sent to the respective recipients, the update request 134 can be sent via at least one of the e-mail servers 108 using SMTP.

Figure 4:
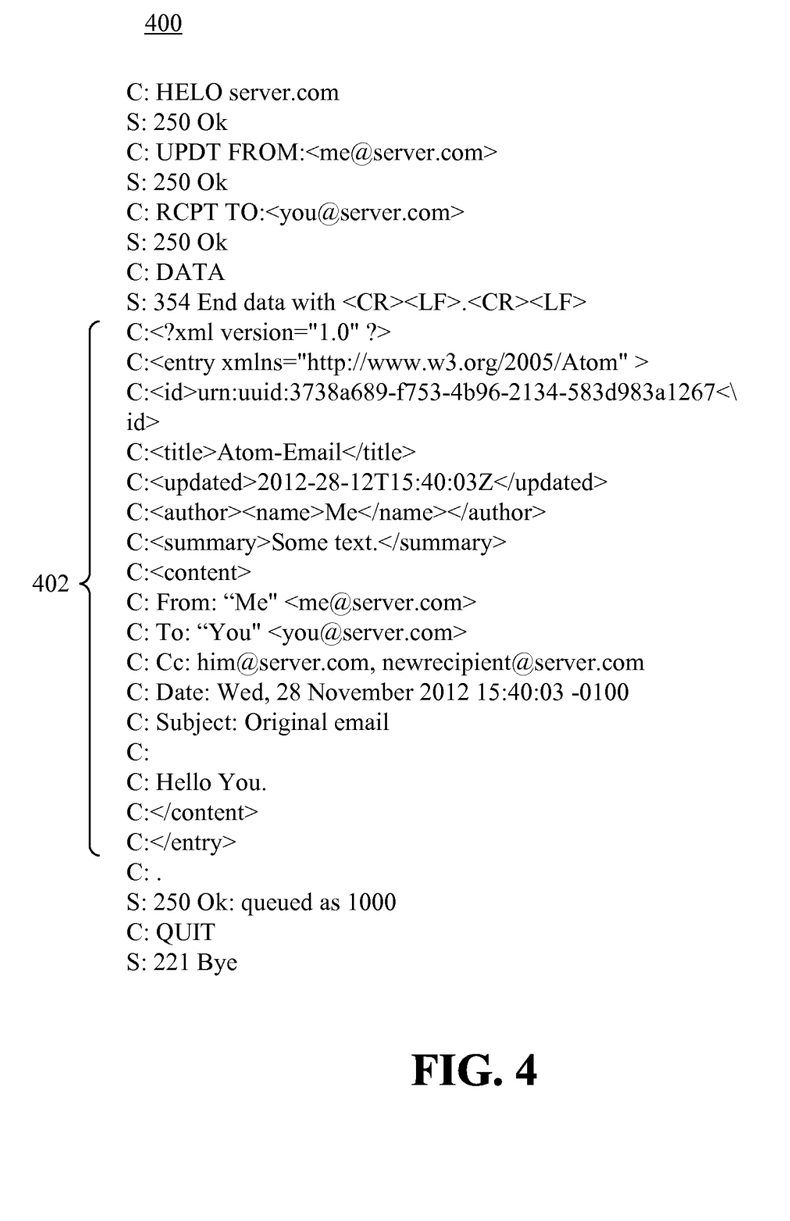
FIG. 4 depicts another example of a SMTP exchange between the e-mail client and the e-mail server when the e-mail client sends an update request to the first version of the e-mail to indicate additional recipients identified in the second version of the e-mail, in accordance with one embodiment disclosed within this specification.

FIG. 4 depicts another example of a SMTP exchange 400 between the e-mail client 102 and the e-mail server 108 when the e-mail client 102 sends an update request 134 of the first version 130 of the e-mail to indicate additional recipients identified in the second version 132 of the e-mail. In FIG. 4, requests/commands sent from the e-mail client 102 to the e-mail server 108 are indicated by "C:" and responses/commands sent from the e-mail server 108 to the e-mail client 102 are indicated by "S:".

In FIG. 4, the command "UPDT FROM: <me@server.com>" can correspond to an update command, thus indicating that the communication pertains to an e-mail (e.g., the first version 130 of the e-mail) that is being updated, and that the SMTP exchange 400 is requesting an update to the e-mail. The command "RCPT TO: <you@server.com>" can indicate the recipients of the update request 134. The command "DATA" can correspond to the DATA command defined in SMTP, and in the present case actually reports an ATOM feed update 402, for the update request 134, contained in the requests/commands sent from the e-mail client 102 to the e-mail server 108. The "content" element (e.g., XML element) in the ATOM feed entry 402 can indicate that the data contained in the element is content for the update request 134. The alphanumeric text "urn:uuid:3738a689-f753-4b96-2134-583d983a1267" in the "id" element can provide the unique identifier (e.g., "3738a689-f753-4b96-2134-583d983a1267") corresponding to the first version 130 of the e-mail, which can be used to update the ATOM feed entry corresponding to the first version 130 of the e-mail with the recipients identified in the second version 132 of the e-mail. Specifically, "'You' <you@server.com>" in the "To:" field can indicate the "To" recipients of the first and second versions of the e-mail and the him@server.com, newrecipient@server.com in the "Cc:" field can indicate the recipients copied on the first and second versions of the e-mail. A "Bcc" field (not shown) also can be a field in the e-mail header of the update request 134.

The e-mail client 102 also can communicate the update request 134, via ATOM publishing protocol, to a respective ATOM feeds server 103 (or ATOM feeds server 110) associated with the e-mail client 102, and such ATOM feeds server can update the ATOM feed entry 202 with the new recipient information contained in the ATOM feed update 402. Specifically, the ATOM feed entry 202 can be updated to include in the list of recipients of the e-mail the recipients who received the second version 132 of the e-mail. In particular, the header of the first version 130 of the e-mail, as represented in the ATOM feed entry 202, can be updated to include the recipients of the second version 132 of the e-mail in addition to the recipients of the first version 130. Further, the e-mail server(s) 108 can be configured to understand the requests/ commands sent by the e-mail client 102 and appropriately update the ATOM feed entry 202 in a respective ATOM feeds server 109 (or ATOM feeds server 110) with the new recipient information contained in the ATOM feed update 402 in addition to the recipients of the first version 130, for example in the header of the first version 130 of the e-mail as represented in the ATOM feed entry 202.

The respective recipients of the update request 134 can receive the update request 134 from the e-mail server(s) 108 as respective ATOM feed update requests. For example, via the e-mail client 104, a recipient can receive the update request 134 from the e-mail server 108 via POP or another suitable protocol. The update request 134 can include the ATOM feed update 402. A recipient of the update request 134 can be prompted to indicate whether the recipient chooses to implement the update request 134. If not, the update request 134 can be declined. If the recipient chooses to accept the update request 134, the e-mail client 104 can communicate the ATOM feed update 402 to the ATOM feeds server 105 (or ATOM feeds server 110) using the ATOM Publishing Protocol to update the ATOM feed entry 202, thus updating the first version 130 of the e-mail with the recipients of the second version 132 of the e-mail. In particular, the header of the first version 130 of the e-mail, for example one or more recipient fields, as represented in the ATOM feed entry 202, can be updated to include the recipients of the second version 132 of the e-mail in addition to the recipients of the first version 130.

Referring again to FIG. 1, since the e-mail clients 102, 104 may be aware, via the update request 134, of new recipients of the e-mail, when users of such e-mail clients 102, 104 choose to reply to all recipients of the e-mail, such reply can include not only the original recipients who received the first version 130 of the e-mail, but also those recipients who received the second version 132 of the e-mail.

Figure 5:
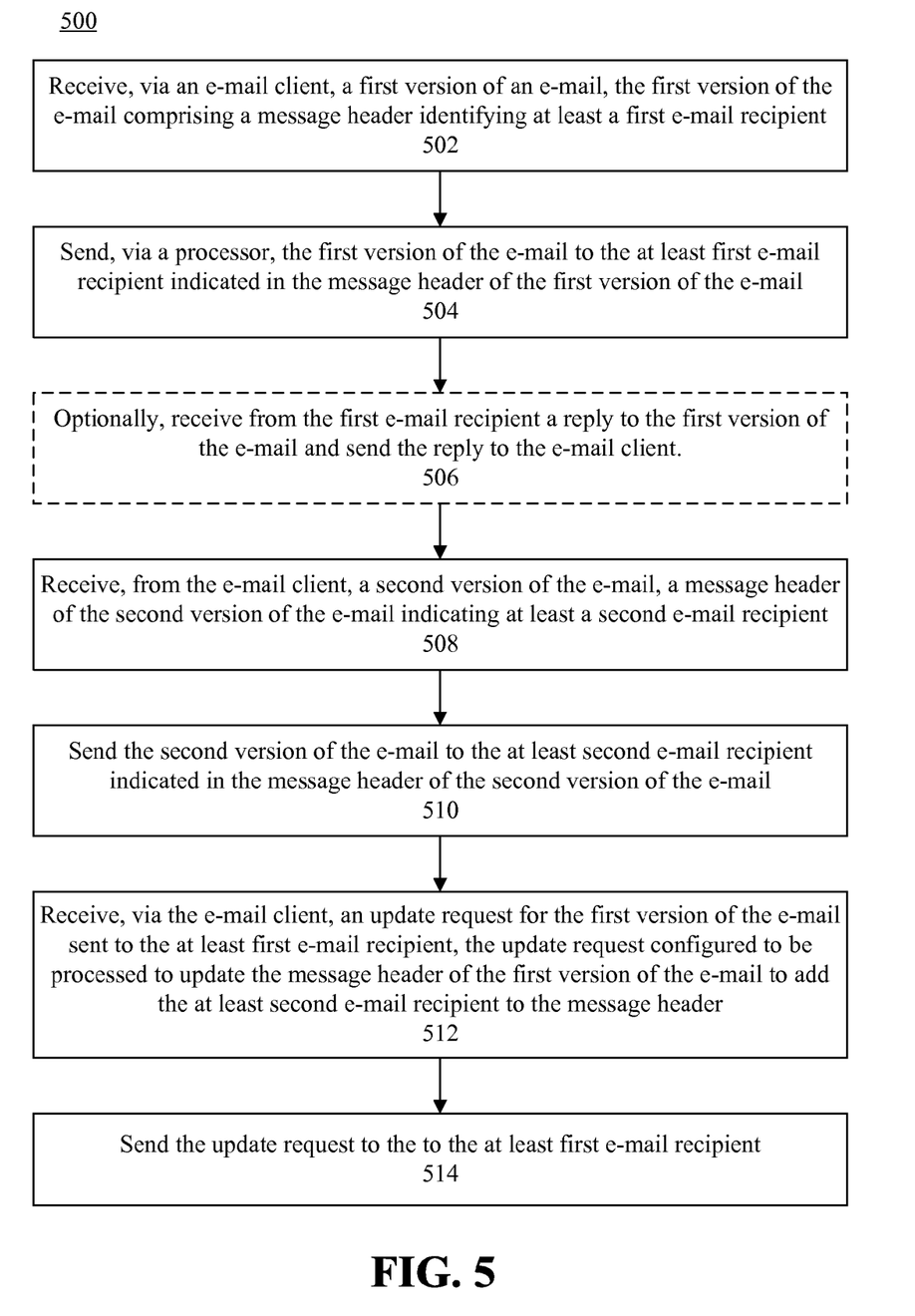
FIG. 5 is a flow chart illustrating a method of updating an e-mail recipient list in accordance with another embodiment disclosed within this specification.

FIG. 5 is a flow chart illustrating a method 500 of updating an e-mail recipient list in accordance with another embodiment disclosed within this specification. The method 500 can be implemented by the e-mail server(s) 108 of FIG. 1.

At step 502, a first version of an e-mail can be received from an e-mail client. The first version of the e-mail can comprise a message header identifying at least a first e-mail recipient. The message header can include, for example a "To" field, a "Cc" field and/or a "Bcc" field. Such fields are known to those skilled in the art. In one arrangement, the first version of the e-mail is formatted as content in an ATOM feed entry creation request and configured to be stored in an ATOM feed entry. At step 504, the first version of the e-mail can be sent, via a processor, to the at least first e-mail recipient indicated in the message header of the first version of the e-mail. Further, the first version of the e-mail can be stored for a user associated with the e-mail client, for example in an ATOM feeds server.

Optionally, at step 506, a reply to the first version of the e-mail can be received from the first e-mail recipient, and the reply e-mail can be sent to the e-mail client. As such, the reply e-mail can be sent to the original sender of the first version of the e-mail. In such case, a reconciliation process can be implemented. Such reconciliation process is described with respect to FIG. 6.

Continuing with FIG. 5, at step 508, a second version of the e-mail can be received from the e-mail client. A message header of the second version of the e-mail can indicate at least a second e-mail recipient. For example, the second e-mail recipient can be identified in a "To" field or a "Cc" field of the second version of the e-mail. In one arrangement, the second version of the e-mail is formatted as content in an ATOM feed entry request and to be stored in an ATOM feed entry. At step 510, the second version of the e-mail can be sent to the at least second e-mail recipient indicated in the message header of the second version of the e-mail.

At step 512, an update request for the first version of the e-mail sent to the at least first e-mail recipient can be received via the e-mail client. The update request can be configured to be processed to update the message header of the first version of the e-mail to add the at least second e-mail recipient to the message header. For example, the update request can be configured to add the at least second e-mail recipient to a recipient field in the message header. In one arrangement, responsive to receiving via the e-mail client the second version of the e-mail, the user can be prompted to indicate whether the user chooses to generate the update request. Responsive to the user indicating that the user chooses to generate the update request, and that the user is authorized to choose the update request to be generated, the update request can be automatically generated. Further, responsive to receiving the update request, the message header of the stored first version of the e-mail can be updated to add the at least second e-mail recipient to the message header. The update request can indicate an ATOM update request to update the ATOM feed entry corresponding to the first version of the e-mail.

At step 514, the update request can be sent to the at least first e-mail recipient.

Figure 6:
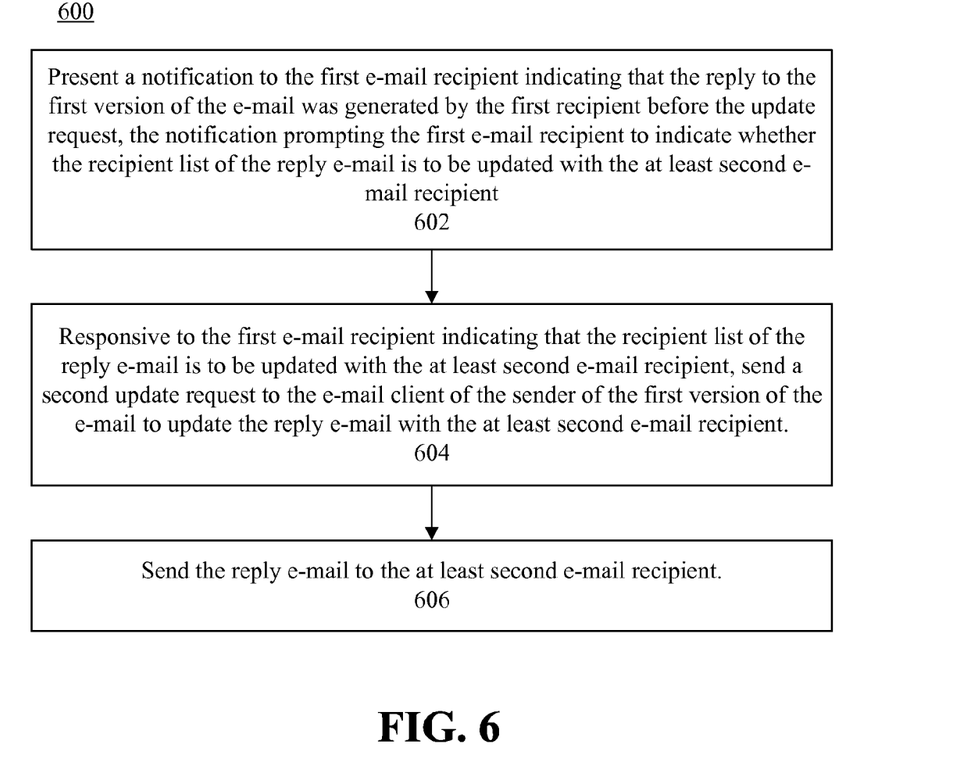
FIG. 6 is a flow chart illustrating a method of updating an e-mail recipient list in accordance with another embodiment disclosed within this specification.

FIG. 6 is a flow chart illustrating a method 600 of updating an e-mail recipient list in accordance with another embodiment disclosed within this specification. The method 600 implements a reconciliation operation in the case that a reply to the first version of the e-mail was generated (FIG. 5, step 506) by a recipient of the first version of the e-mail prior to the update request being generated. The method 600 can update the recipient list of the reply e-mail. The method 600 can be implemented after, or continue from, step 514 of FIG. 5.

At step 602, a notification can be presented to the first e-mail recipient who generated the reply to the first version of the e-mail (reply e-mail). The notification can indicate that the reply e-mail received was generated before the update request. Further, the notification can prompt the first recipient to indicate whether the recipient list of the reply e-mail is to be updated with the at least second e-mail recipient. If the first recipient chooses not to do so, the process can end. If, however, the first recipient indicates that the recipient list of the reply e-mail is to be updated with the at least second e-mail recipient, at step 604 a second update request can be generated and sent to the e-mail client of the sender of the first version of the e-mail to update the reply e-mail with the at least second e-mail recipient. The second update request can be configured to be processed to update a message header of the reply e-mail to add the at least second e-mail recipient to the message header of the reply e-mail.

Further, at step 606, the reply e-mail can be sent to the at least second recipient. For example, e-mail server(s) can receive the reply e-mail from the e-mail client of the sender of the first version of the e-mail can send the reply e-mail to the second recipient(s).

Figure 7:
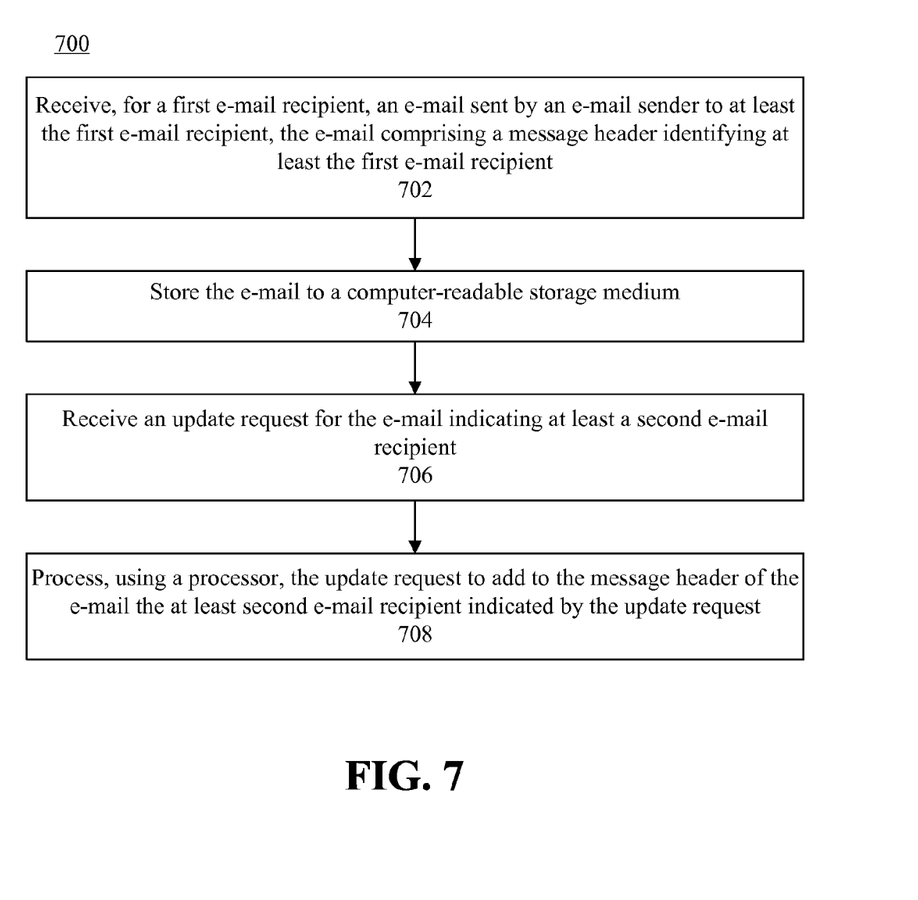
FIG. 7 is a flow chart illustrating a method of updating an e-mail recipient list in accordance with another embodiment disclosed within this specification.

FIG. 7 is a flow chart illustrating a method 700 of updating an e-mail recipient list in accordance with another embodiment disclosed within this specification. The method 700 can be implemented by the e-mail client 104 of FIG. 1.

At step 702, for a first e-mail recipient, an e-mail sent by an e-mail sender to at least the first e-mail recipient can be received. The e-mail can comprise a message header identifying at least the first e-mail recipient. In one arrangement, the e-mail can be formatted as content in an ATOM feed entry creation request and configured to be stored in an ATOM feed entry. At step 704, the e-mail can be stored to a computer-readable storage medium.

At step 706, an update request for the e-mail can be received. The update request can indicate at least a second e-mail recipient. In one arrangement, the update request can indicate an ATOM update request to update the ATOM feed entry. At step 708, using a processor, the update request can be processed to add to the message header of the e-mail the at least second e-mail recipient indicated by the update request.

Figure 8:
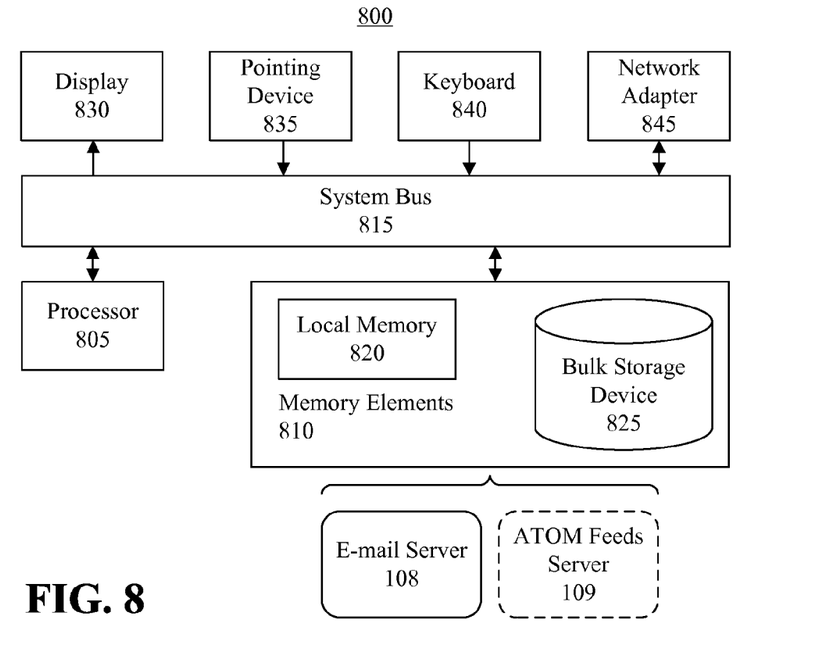
FIG. 8 is a block diagram illustrating a processing system hosting an e-mail server in accordance with another embodiment disclosed within this specification.

FIG. 8 is a block diagram illustrating a processing system 800 configured to host an e-mail server 108 (FIG. 1) in accordance with another embodiment disclosed within this specification. The processing system 800 can include at least one processor 805 (e.g., a central processing unit) coupled to memory elements 810 through a system bus 815 or other suitable circuitry. As such, the processing system 800 can store program code within the memory elements 810. The processor 805 can execute the program code accessed from the memory elements 810 via the system bus 815. It should be appreciated that the processing system 800 can be implemented in the form of any system including a processor and memory that is capable of performing the functions and/or operations described within this specification. For example, the processing system 800 can be implemented as a computer, a workstation, a mobile computer, a laptop computer, tablet computer, a smart phone, a personal digital assistant, a gaming device, an appliance, and so on.

The memory elements 810 can include one or more physical memory devices such as, for example, local memory 820 and one or more bulk storage devices 825. Local memory 820 refers to RAM or other non-persistent memory device(s) generally used during actual execution of the program code. The bulk storage device(s) 825 can be implemented as a hard disk drive (HDD), solid state drive (SSD), or other persistent data storage device. The processing system 800 also can include one or more cache memories (not shown) that provide temporary storage of at least some program code in order to reduce the number of times program code must be retrieved from the bulk storage device 825 during execution.

Optionally, input/output (I/O) devices such as a display 830, a pointing device 835 and a keyboard 840 can be coupled to the processing system 800. The I/O devices can be coupled to the processing system 800 either directly or through intervening I/O controllers. For example, the display 830 can be coupled to the processing system 800 via a graphics processing unit (GPU), which may be a component of the processor 805 or a discrete device. One or more network adapters 845 also can be coupled to processing system 800 to enable processing system 800 to become coupled to other systems, computer systems, remote printers, and/or remote storage devices through intervening private or public networks. Modems, cable modems, and Ethernet cards are examples of different types of network adapters 845 that can be used with processing system 800.

As pictured in FIG. 8, the memory elements 810 can store the e-mail server 108. Optionally, the memory elements also can store the ATOM feeds server 109, or the ATOM feeds server 109 can be stored in another system to which the processing system 800 is communicatively linked, for example via the network adapter 845. Being implemented in the form of executable program code, the e-mail server 108 can be executed by the processing system 800 and, as such, can be considered part of the processing system 800. Moreover, the e-mail server 108 is a functional data structure that imparts functionality when employed as part of the processing system 800 of FIG. 8. The ATOM feeds server 109 also can be a functional data structure that imparts functionality when processed by the processing system 800 of FIG. 8, and can be considered part of the processing system 800 if executed by the processing system 800.

Figure 9:
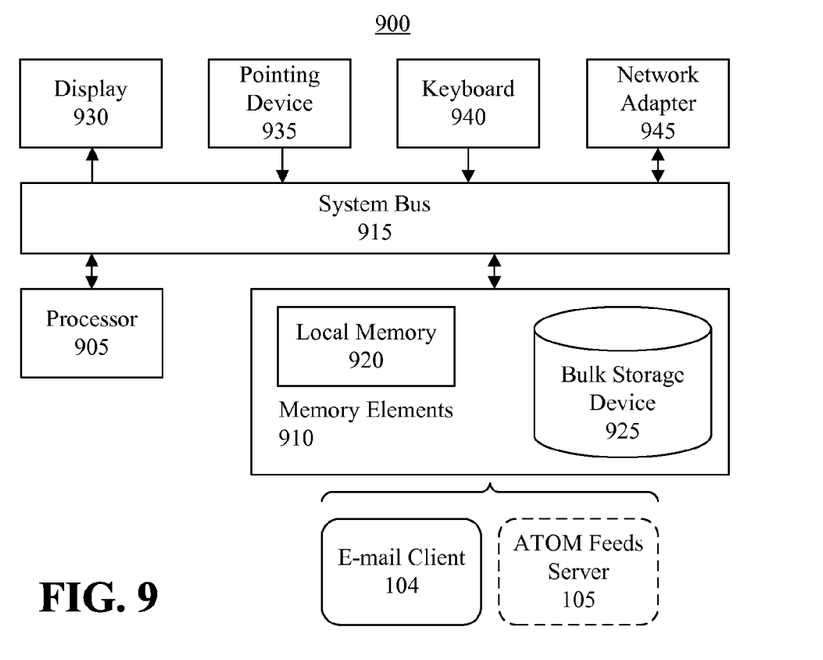
FIG. 9 is a block diagram illustrating a processing system hosting an e-mail client in accordance with another embodiment disclosed within this specification.

FIG. 9 is a block diagram illustrating a processing system 900 hosting an e-mail client 104 in accordance with another embodiment disclosed within this specification. The processing system 900 can include at least one processor 905 (e.g., a central processing unit) coupled to memory elements 910 through a system bus 915 or other suitable circuitry. As such, the processing system 900 can store program code within the memory elements 910. The processor 905 can execute the program code accessed from the memory elements 910 via the system bus 915. It should be appreciated that the processing system 900 can be implemented in the form of any system including a processor and memory that is capable of performing the functions and/or operations described within this specification. For example, the processing system 900 can be implemented as a computer, a workstation, a mobile computer, a laptop computer, tablet computer, a smart phone, a personal digital assistant, a gaming device, an appliance, and so on.

The memory elements 910 can include one or more physical memory devices such as, for example, local memory 920 and one or more bulk storage devices 925. Local memory 920 refers to RAM or other non-persistent memory device(s) generally used during actual execution of the program code. The bulk storage device(s) 925 can be implemented as a hard disk drive (HDD), solid state drive (SSD), or other persistent data storage device. The processing system 900 also can include one or more cache memories (not shown) that provide temporary storage of at least some program code in order to reduce the number of times program code must be retrieved from the bulk storage device 925 during execution.

Input/output (I/O) devices such as a display 930, a pointing device 935 and a keyboard 940 can be coupled to the processing system 900. The I/O devices can be coupled to the processing system 900 either directly or through intervening I/O controllers. For example, the display 930 can be coupled to the processing system 900 via a graphics processing unit (GPU), which may be a component of the processor 905 or a discrete device. One or more network adapters 945 also can be coupled to processing system 900 to enable processing system 900 to become coupled to other systems, computer systems, remote printers, and/or remote storage devices through intervening private or public networks. Modems, cable modems, and Ethernet cards are examples of different types of network adapters 945 that can be used with processing system 900.

As pictured in FIG. 9, the memory elements 910 can store the e-mail client 104. Optionally, the memory elements also can store the ATOM feeds server 105, or the ATOM feeds server 105 can be stored in another system to which the processing system 900 is communicatively linked, for example via the network adapter 945. Being implemented in the form of executable program code, the e-mail client 104 can be executed by the processing system 900 and, as such, can be considered part of the processing system 900. Moreover, the e-mail client 104 is a functional data structure that imparts functionality when employed as part of the processing system 900 of FIG. 9. The ATOM feeds server 105 also can be a functional data structure that imparts functionality when processed by the processing system 900 of FIG. 9, and can be considered part of the processing system 900 if executed by the processing system 900. The e-mail clients 102, 106 (FIG. 1) can be executed by processing systems similar to the processing system 900.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowcharts illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A system comprising:
a hardware processor programmed to initiate executable operations comprising:
receiving, via an e-mail client, a first version of an e-mail, the first version of the e-mail comprising a message header identifying at least a first e-mail recipient;
storing the first version of the e-mail for a user associated with the e-mail client;
sending the first version of the e-mail to the at least first e-mail recipient indicated in the message header of the first version of the e-mail;
receiving, via the e-mail client, a second version of the e-mail, a message header of the second version of the e-mail indicating at least a second e-mail recipient;
sending the second version of the e-mail to the at least second e-mail recipient indicated in the message header of the second version of the e-mail; and
receiving, via the e-mail client, an update request for the first version of the e-mail sent to the at least first e-mail recipient, the update request configured to be processed to update the message header of the first version of the e-mail to add the at least second e-mail recipient to the message header; and
responsive to receiving the update request, updating the message header of the stored first version of the e-mail to add the at least second e-mail recipient to the message header.

2. The system of claim 1, wherein:
the first version of the e-mail is formatted as content in an ATOM feed entry creation request and configured to be stored in an ATOM feed entry; and
the update request indicates an ATOM update request to update the ATOM feed entry, the update to the ATOM feed entry updating the message header of the first version of the e-mail to add the at least second e-mail recipient to the message header.

3. The system of claim 1, wherein:
the update request is configured to be processed to update a recipient field in the message header of the first version of the e-mail to add the at least second e-mail recipient to a recipient field in the message header.

4. The system of claim 1, the executable operations further comprising:
responsive to receiving via the e-mail client the second version of the e-mail, prompting the user to indicate whether the user chooses to generate the update request; and
responsive to the user indicating that the user chooses to generate the update request, automatically generating the update request.

5. The system of claim 4, wherein:
automatically generating the update request further is responsive to determining that the user is authorized to choose the update request to be generated.

6. A computer program product for updating an e-mail recipient list, the computer program product comprising a computer readable storage device having program code stored thereon, the program code executable by a processor to perform a method comprising:
receiving, by the processor, via an e-mail client, a first version of an e-mail, the first version of the e-mail comprising a message header identifying at least a first e-mail recipient;
storing, by the processor, the first version of the e-mail for a user associated with the e-mail client;
sending, by the processor, the first version of the e-mail to the at least first e-mail recipient indicated in the message header of the first version of the e-mail;
receiving, by the processor, via the e-mail client, a second version of the e-mail, a message header of the second version of the e-mail indicating at least a second e-mail recipient;
sending, by the processor, the second version of the e-mail to the at least second e-mail recipient indicated in the message header of the second version of the e-mail; and
receiving, by the processor, via the e-mail client, an update request for the first version of the e-mail sent to the at least first e-mail recipient, the update request configured to be processed to update the message header of the first version of the e-mail to add the at least second e-mail recipient to the message header; and
responsive to receiving the update request, updating, by the processor, the message header of the stored first version of the e-mail to add the at least second e-mail recipient to the message header.

7. The computer program product of claim 6, wherein:
the first version of the e-mail is formatted as content in an ATOM feed entry creation request and configured to be stored in an ATOM feed entry; and
the update request indicates an ATOM update request to update the ATOM feed entry, the update to the ATOM feed entry updating the message header of the first version of the e-mail to add the at least second e-mail recipient to the message header.

8. The computer program product of claim 6, wherein:
the update request is configured to be processed to update a recipient field in the message header of the first version of the e-mail to add the at least second e-mail recipient to a recipient field in the message header.

9. The computer program product of claim 6, the method further comprising:
responsive to receiving via the e-mail client the second version of the e-mail, by the processor, prompting the user to indicate whether the user chooses to generate the update request; and
responsive to the user indicating that the user chooses to generate the update request, by the processor, automatically generating the update request.

10. The computer program product of claim 9, wherein:
automatically generating the update request further is responsive to determining that the user is authorized to choose the update request to be generated.

11. The computer program product of claim 6, the method further comprising:
receiving from the first e-mail recipient a reply to the first version of the e-mail;
sending to the e-mail client the reply to the first version of the e-mail;
prompting the first e-mail recipient to indicate whether a recipient list of the reply e-mail is to be updated with the at least second e-mail recipient;
responsive to the first e-mail recipient indicating that the recipient list of the reply e-mail is to be updated with the at least second e-mail recipient, sending a second update request to the e-mail client, the second update request configured to be processed to update a message header of the reply to the first version of the e-mail to add the at least second e-mail recipient to the message header of the reply to the first version of the e-mail.

12. The computer program product of claim 11, the method further comprising:
  sending the reply to the first version of the e-mail to the at least second e-mail recipient.

13. The system of claim 1, the executable operations further comprising:
  receiving from the first e-mail recipient a reply to the first version of the e-mail;
  sending to the e-mail client the reply to the first version of the e-mail;
  prompting the first e-mail recipient to indicate whether a recipient list of the reply e-mail is to be updated with the at least second e-mail recipient;
  responsive to the first e-mail recipient indicating that the recipient list of the reply e-mail is to be updated with the at least second e-mail recipient, sending a second update request to the e-mail client, the second update request configured to be processed to update a message header of the reply to the first version of the e-mail to add the at least second e-mail recipient to the message header of the reply to the first version of the e-mail.

14. The system of claim 13, the executable operations further comprising:
  sending the reply to the first version of the e-mail to the at least second e-mail recipient.

\* \* \* \* \*